(12) United States Patent
Sundholm

(10) Patent No.: US 10,065,809 B2
(45) Date of Patent: Sep. 4, 2018

(54) METHOD FOR HANDLING MATERIAL IN A MATERIAL CONVEYING SYSTEM, AN INPUT POINT OF A MATERIAL CONVEYING SYSTEM AND A MATERIAL CONVEYING SYSTEM

(71) Applicant: MARICAP OY, Vantaa (FI)

(72) Inventor: Göran Sundholm, Tuusula (FI)

(73) Assignee: MARICAP OY, Vantaa (FI)

( * ) Notice: Subject to any disclaimer, the term of this patent is extended or adjusted under 35 U.S.C. 154(b) by 0 days.

(21) Appl. No.: 15/115,543

(22) PCT Filed: Feb. 12, 2015

(86) PCT No.: PCT/FI2015/050087
§ 371 (c)(1),
(2) Date: Jul. 29, 2016

(87) PCT Pub. No.: WO2015/124832
PCT Pub. Date: Aug. 27, 2015

(65) Prior Publication Data
US 2017/0166409 A1    Jun. 15, 2017

(30) Foreign Application Priority Data
Feb. 18, 2014    (FI) ...................................... 20145158

(51) Int. Cl.
*B65G 53/40*    (2006.01)
*B65G 51/02*    (2006.01)

(52) U.S. Cl.
CPC ...... *B65G 51/02* (2013.01); *B65G 2812/1625* (2013.01)

(58) Field of Classification Search
CPC ........ B65G 51/02; B65G 51/08; B65G 51/16; B65G 53/04; B65G 53/24; B65G 53/26; B65G 53/66; B65F 5/005
(Continued)

(56) References Cited

U.S. PATENT DOCUMENTS 1,944,363 A * 1/1934 Samuel .................. B65G 51/16
406/17
1,973,954 A * 9/1934 Grover .................. B65G 51/16
137/486
(Continued)

FOREIGN PATENT DOCUMENTS

CN      2782832 Y    5/2006
CN    101500911 A    8/2009
(Continued)

OTHER PUBLICATIONS

International Search Report (PCT/ISA/210) issued in PCT/FI2015/050087, dated May 6, 2015.
(Continued)

*Primary Examiner* — William R Harp
(74) *Attorney, Agent, or Firm* — Birch, Stewart, Kolasch & Birch, LLP

(57) ABSTRACT

A method for feeding in and transporting material in a pneumatic conveying system includes at least one input point, a material conveying pipe, and a material container. A partial-vacuum source produces a partial vacuum/a pressure difference and a transporting air current in the conveying pipe. A shut-off element, arranged on an opposite side of an input aperture with respect to a feeder channel, is movable by suction from a first position, in which the shut-off element does not make a pathway through an input aperture into the feeder channel smaller, into a second position, in which the shut-off element does make the pathway through the input aperture into the feeder channel smaller, when the pressure on a first side, on the feeder channel side, of the shut-off element is smaller than on a second side, on an opposite side with respect to the feeder channel, of the shut-off element.

25 Claims, 5 Drawing Sheets

(58) Field of Classification Search
USPC .................................. 406/117, 151, 152, 108
See application file for complete search history.

(56) References Cited

U.S. PATENT DOCUMENTS

| | | | | |
|---|---|---|---|---|
| 3,953,078 | A | * 4/1976 | Aitken | ................... B65F 5/005 406/117 |
| 4,108,498 | A | * 8/1978 | Bentsen | ................. B65F 5/005 137/614.21 |
| 2010/0218336 | A1 | 9/2010 | Kilhlstrom | |
| 2010/0270302 | A1 | 10/2010 | Sundholm | |

FOREIGN PATENT DOCUMENTS

| | | |
|---|---|---|
| CN | 201545440 U | 8/2010 |
| CN | 101896412 A | 11/2010 |
| CN | 201729455 U | 2/2011 |
| FI | 124207 B | 5/2014 |
| GB | 2 225 709 A | 6/1990 |
| KR | 10-2010-0094645 A | 8/2010 |
| KR | 10-2012-0025268 A | 3/2012 |
| WO | WO 2009/063130 A1 | 5/2009 |
| WO | WO 2014/064332 A1 | 5/2014 |

OTHER PUBLICATIONS

Written Opinion (PCT/ISA/237) issued in PCT/FI2015/050087, dated May 6, 2015.
English translation of Chinese Search Report for Chinese Application No. 201580006743.2, dated Mar. 27, 2018.

\* cited by examiner

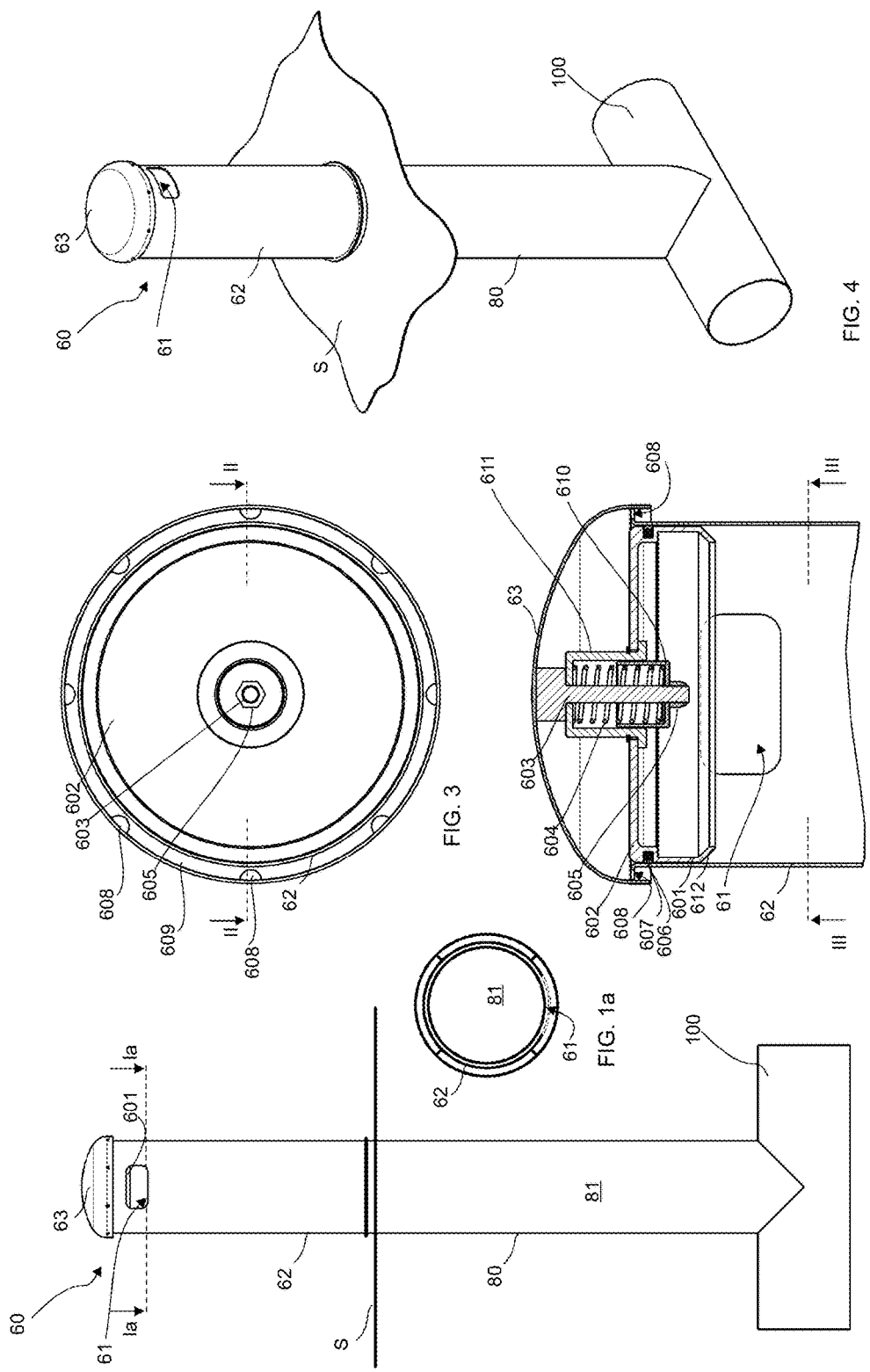

METHOD FOR HANDLING MATERIAL IN A MATERIAL CONVEYING SYSTEM, AN INPUT POINT OF A MATERIAL CONVEYING SYSTEM AND A MATERIAL CONVEYING SYSTEM

FIELD OF THE INVENTION

The object of an embodiment of the invention is a method for feeding in and transporting material in a pneumatic conveying system for material.

The object of an embodiment of the invention is to provide an input point of a material conveying system.

The object of an embodiment of the invention is also to provide a material conveying system.

BACKGROUND OF THE INVENTION

The invention relates generally to pneumatic material-conveying systems, such as to partial-vacuum transporting systems, more particularly to the collection and conveying of wastes, such as to the conveying of household wastes and litter.

Systems wherein wastes are conveyed in piping by means of suction and/or transporting air are known in the art. In these, wastes are moved long distances in the piping pneumatically, by means of suction and/or a pressure difference, together with the transporting air. The apparatuses are used for, among other things, the conveying of wastes in different institutions, for the conveying of household waste or for the conveying of other waste. It is typical to these systems that a partial-vacuum apparatus is used to achieve a pressure difference, in which apparatus a partial vacuum is achieved in the conveying pipe with partial-vacuum generators, such as with vacuum pumps or with an ejector apparatus. A conveying pipe typically comprises at least one valve means, by opening and closing which the replacement air coming into the conveying pipe is regulated. One of the convenient solutions of new regional building projects is waste management that will operate with a pipe transport system. This means that sorted wastes are sucked along underground pipes to a waste station that is common to the whole region. The system is clean, odorless and noise-free, and is also a more environmentally friendly solution than conventional waste management and a safer solution from the viewpoint of the adjacent area. On the other hand, there are a lot of quite small sites, such as office properties, commercial properties, industrial properties and especially residential properties or other sites, in which it is desired to achieve a pneumatic pipe transport solution for wastes, but which are not economically viable to equip with their own partial-vacuum generating apparatus or with a separating device and a separate container.

Additionally, one problem is that the litter bins in parks and public spaces are emptied too seldom. Another problem is also that objects are put into them, which can be problematic for the personnel manually emptying them, such as sharp objects, e.g. syringes used for drugs or corresponding.

In prior-art solutions the input points for material often have complex valve arrangements, with which the connection of the input point to the conveying piping and/or the access of replacement air from the input point into the conveying piping is controlled. In many cases complex input point arrangements are undesirable. Indeed, needs have arisen wherein the aim is a simpler input point than earlier, having investment costs and operating costs that are advantageous with respect to known solutions and the maintenance of which is easy.

The aim of the present invention is to achieve a new type of solution in connection with material conveying systems, by means of which solution the drawbacks of prior art solutions are avoided. Another aim of the invention is to achieve a solution more particularly for larger systems than small systems, in which however it is not desired to use complex input points. Yet another aim is to achieve a wastes conveying system, which is suited for use in the collection of the litter of public spaces, such as parks.

BRIEF DESCRIPTION OF THE INVENTION

The invention is based on a concept wherein the flow resistance of an input point of a pneumatic conveying system for material, such as the local resistance produced by an input aperture, can be adjusted on the basis of the strength of the suction effect brought about in the input point by the partial-vacuum generator.

The method according to an embodiment of the invention includes:
providing at least one input point for supplying material,
providing a material conveying pipe operatively connected to the input point, and
providing a material container wherein the material being transported is separated from conveying air, and
providing a partial-vacuum source for generating a partial vacuum/a pressure difference and a transporting air flow in the conveying pipe at least during the transporting of material, wherein a suction side of the partial-vacuum source is connected to act in the conveying pipe and onwards to the input point operatively connected to the conveying pipe, or to act at least in a feeder channel that is between the conveying pipe and an input point,
providing the feeder channel, for emptying to be closest to the material container in a conveying direction wherein the material empties into the material container,
providing a shut-off element on an inside of said input point and on an opposite side of an input aperture with respect to the feeder channel, said shut-off element being moved by means of the suction produced by the partial-vacuum source from a first position, in which the shut-off element does not make a pathway through the input aperture into the feeder channel smaller, into a second position, in which the shut-off element does make the pathway through the input aperture into the feeder channel smaller, when the pressure on a first side, on the feeder channel side, of the shut-off element is smaller than on a second side, on an opposite side with respect to the feeder channel, of the shut-off element.

The input point, according to an embodiment of the invention includes:
one or more input apertures for feeding material into a feeder channel, which is connected to a conveying pipe,
a shut-off element arranged in the input point, on the inside of said input point and on an opposite side of the one or more input apertures with respect to the feeder channel, and
said shut-off element being arranged to be movable, by means of a suction produced by a partial-vacuum source, from a first position, in which the shut-off element does not make the pathway through the one or more input apertures into the feeder channel smaller, into a second position, in which the shut-off element does make the pathway through the input aperture into the feeder channel smaller, when pressure on a first side, on a feeder-channel side, of the shut-off element is smaller than on a second side, on an opposite side with respect to the feeder channel, of the shut-off element.

The material conveying system according to an embodiment of the invention includes:

at least one input point for supplying material, said input point being operatively connected to conveying piping for the material, a partial-vacuum source for achieving a partial vacuum/a pressure difference/a transporting air flow in the conveying piping, and a material container, wherein the material being transported together with the transporting air is deposited and in which the transporting air and the material being transported are separated from each other, a shut-off element being arranged in at least one input point of the system, on an inside of said input point and on an opposite side of the input aperture with respect to the feeder channel, said shut-off element being arranged to be movable, by means of suction produced by the partial-vacuum source, from a first position, in which the shut-off element does not make a pathway through the input aperture into the feeder channel smaller, into a second position, in which the shut-off element does make the pathway through the input aperture into the feeder channel smaller, when the pressure on a first side, on a feeder channel side, of the shut-off element is smaller than on a second side, on an opposite side with respect to the feeder channel, of the shut-off element.

The solution according to the invention has a number of important advantages. By means of the invention the drawbacks of prior-art solutions can be avoided. In the solution according to the invention an input point that is surprisingly simple in terms of its means can be applied, the connection of the input aperture of which input point to the conveying pipe opens and closes automatically by means of the suction produced by the partial-vacuum source and by means of a shut-off element arranged in the input point. In this case also the access of replacement air via the input aperture is limited automatically. The method, input point and system according to the invention do not require complex valve arrangements in connection with the input points. With the solution according to the invention the waste management of public spaces, e.g. parks, can be efficiently managed, in which case when replacing conventional litter bins with input points according to the invention the manual emptying of litter bins is avoided and at the same time the manual handling of possible dangerous objects in connection with emptying is avoided. The flow resistance of the input point can be acted upon with the size and with the other properties of the input aperture. By using a shut-off means, which is formed to be a piston means, an effective and operationally dependable solution for constricting the pathway for replacement air occurring via an input aperture is achieved as a result of the suction/pressure difference acting in the input point. Leaving the input aperture partly open improves safety and prevents objects remaining between the shut-off element and the edge of the input aperture. By arranging a flexing means to act on the shut-off element, the closing sensitivity of the shut-off means, i.e. the sensitivity of moving from the first position into the second position, can be adjusted and an operationally reliable return movement of the shut-off means from the second position into the first position is achieved. With the solution according to the invention an effective and structurally simple solution for constricting or at least partially closing an input aperture of an input point is achieved. The solution according to the invention is well suited for use in connection with different types of pneumatic conveying systems for material. The material conveying system according to the invention is typically best suited to small systems, in which the number of input points is 1-10 units and also to larger systems than rather small systems, in which the number of input points is greater than ten units. The material collection container at the material delivery end of the system can be fixed or it can be a transportation container or a so-called deep collection container-separating device. By using a deep collection container as a separating device, the material conveyed into the collection container can be efficiently stored, and emptying of the container can be performed less frequently. Emptying of the collection container can be performed by lifting the collection container and by transferring the material that has collected in the container from an openable and closable aperture arranged in the bottom part of the container into the container of a transportation means, such as of a garbage truck. The transportation means can comprise a press for compressing the material so it becomes denser and a hoist for lifting the collection container. With the solution according to the invention, the separating device of a pneumatic pipe transport system for material and the collection container intended for temporary storage of the transported material can be efficiently combined. When the collection container is a so-called deep collection container, which is at least partly embedded below the surface level of the ground, or corresponding surface level, the space requirement can be efficiently reduced. According to one preferred embodiment the deep collection container-separating device comprises a collection container and an external container, into which the collection container is arranged and from which the collection container is lifted for emptying. A mobile partial-vacuum generating apparatus can be used effectively in connection with the material conveying system of the invention to achieve the partial vacuum needed in the pneumatic transportation of material. In this case a dedicated fixed partial-vacuum generating apparatus is not needed in individual material conveying systems. The system thus enables the division of effective operating time of the partial-vacuum source between many material conveying systems. The system also enables the offering of the vacuum source of the material conveying system as a service to properties. In addition, the system enables an effective way to ensure material conveying by using a number of mobile vacuum sources, in which case e.g. in a malfunction situation a primary vacuum source can easily be replaced with a second mobile backup apparatus. The mobile partial-vacuum source according to the invention fits to function in more cramped locations also because it can be arranged in a vehicle, in which space at the same time for wastes is not needed. The solution according to the invention effectively enables a different frequency for the operation of the partial-vacuum source and for the emptying of a container.

BRIEF DESCRIPTION OF THE FIGURES

In the following, the invention will be described in more detail by the aid of an embodiment with reference to the attached drawings, wherein FIG. 1 presents a simplified input point according to an embodiment of the invention, when connected to a conveying pipe and in a first operating state, FIG. 1a presents a cross-section along the line Ia-Ia of FIG. 1, FIG. 2 presents a cross-section of a detail of the input point of the embodiment of FIG. 1 cross-sectioned along the line II-II of FIG. 3, FIG. 3 presents a cross-section along the line III-III of FIG. 2, FIG. 4 presents an input point according to an embodiment of the invention.

DETAILED DESCRIPTION OF THE INVENTION

Figure 8:
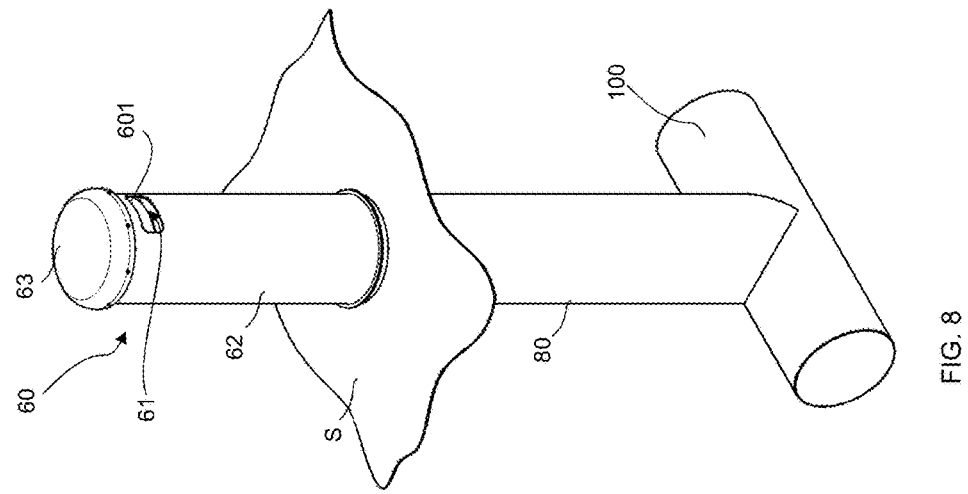
FIG. 8 presents an input point according to an embodiment of the invention.
Figure 7:
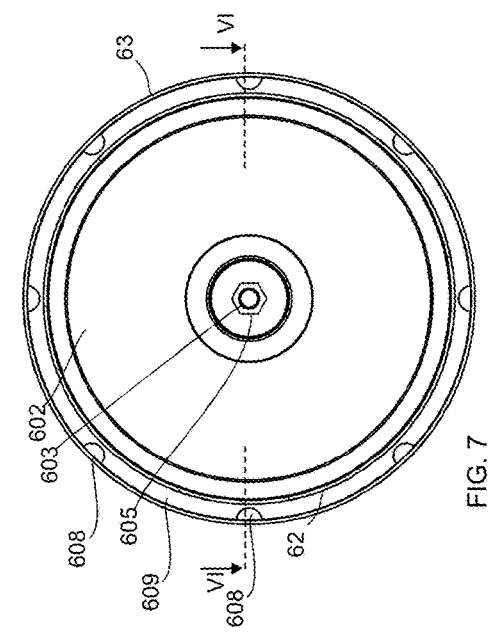
FIG. 7 presents a cross-section along the line VII-VII of FIG. 6.

FIGS. 1-2 present a part of a pneumatic material-conveying system, which part comprises a material conveying pipe 100, along the side of which at least one, typically many, input points 60 are arranged. An input point 60 is a feed-in station for material, more particularly of waste material, intended to be transported, from which station the material, more particularly waste material, such as litter, household waste, or recyclable material intended to be transported, is fed into the conveying system. An input point 60 can also be a refuse chute, into which material is fed from input apertures on different floors of a building. The system can comprise a number of input points 60, from which the material intended for transporting is fed into conveying piping 100. An input point 60 is connected directly to the conveying pipe 100 or to an input pipe 80 in connection with it. Inside the input pipe is a feeder channel 81, which extends to the conveying pipe 100. The feeder channel 81 is adapted to function as a material space, in which the material fed into the input point is stored, until it is conveyed in the pneumatic material-conveying system along conveying piping into a material container, where it is separated from the transporting air. Various material conveying systems are described hereinafter in connection with FIGS. 9-11. In the figure the input point 60 is arranged above a mounting surface s, such as above the level of the surface of the ground. The feeder channel 81 extends to a conveying pipe 100 running below the surface of the ground, in which case there is a pathway from the input aperture 61 of the input point via the feeder channel 81 into the conveying pipe 100. An input point comprises a frame, comprising a side wall 62 and a top wall 63. There are one or more input apertures 61, in the embodiment of the figure one, which is arranged in the side wall 62, in the top part of it. In the embodiment of the invention the side wall 62 is an envelope part.

Means for partially closing the input aperture 61 of an input point are arranged in the top part of the input point, in the embodiment of FIG. 2 inside the space bounded by the wall 62 of the frame. The means comprise a shut-off element 601, which is arranged movably between at least two positions, a first position (FIGS. 1-4), in which the input aperture 61 is essentially open, and a second position (FIGS. 5-8), in which the shut-off element 601 covers at least a part of the input aperture 61. The shut-off element 601 constricts the pathway for replacement air running through the input aperture 61. According to one embodiment the shut-off element covers in the second position an essential part, e.g. 50-90%, of the input aperture 61. According to one embodiment in the second position a free space remains between the bottom edge of the shut-off element 601 and the bottom edge of the input aperture 601, which free space is adapted to be of such a height that the squashing of a user's fingers or of some other object left between the shut-off element 601 and the edge of the input aperture 61 is avoided.

In the embodiments of FIGS. 1-7 the shut-off element 601 is a piston element, which is arranged to move inside the input point from a first position (FIG. 2) into a second position (FIG. 6) by means of the suction effect acting in the feeder channel 81 and in the input point from the direction of the material conveying pipe 100, said effect being brought about by the partial-vacuum generator of the pneumatic material-conveying system. The shut-off element 601 moves from the second position into the first position by means of the force effect of the flexing element 604 when the suction effect has essentially decreased or the suction is not acting at all.

In the embodiment of FIGS. 1-7, the shut-off element 601 is arranged to be movable while supported by a support means/guide means 603. The support means/guide means 603 is arranged in a supported manner on the structures, in the embodiment of FIG. 2 on the top wall, of an input point, from where it extends downwards in FIG. 2. An aperture is formed in the frame part 602 of the shut-off element 601, through which aperture the support means/guide means 603 extends at least in the first position. A flexing element 604 is arranged in connection with the shut-off means 601. In the figure the flexing element 604 is a spring means, more particularly a helical spring means, which is arranged around the support means/guide means 603 to act on the shut-off element by bringing about a force effect on it in the direction that resists the movement of the shut-off means from the first position into the second position. Correspondingly, the force effect brings about the movement of the shut-off means from the second position into the first position when the suction of the partial-vacuum generator of the pneumatic wastes-conveying system does not act from the direction of the feeder channel of the input point. The flexing element 604 is arranged between a first support part 610 and a second support part 611. The first support part 610 is supported on a fixing means 605, such as e.g. a nut, arranged on the free end of the support means/guide means 603. The fixing means 605, such as a nut, is in turn arranged on the counterthreads arranged on the free end of the support means/guide means.

The shut-off element 601 is arranged into contact with the inside surface of the side wall 62 of the input point. A sealing means 607 is arranged on the surface of the shut-off element that is towards the side wall of the input point. In the embodiment of FIG. 2 the sealing means is arranged in a groove 606 formed in the shut-off element 601, in the wall that is towards the side wall 62 of the input point.

Figure 6:
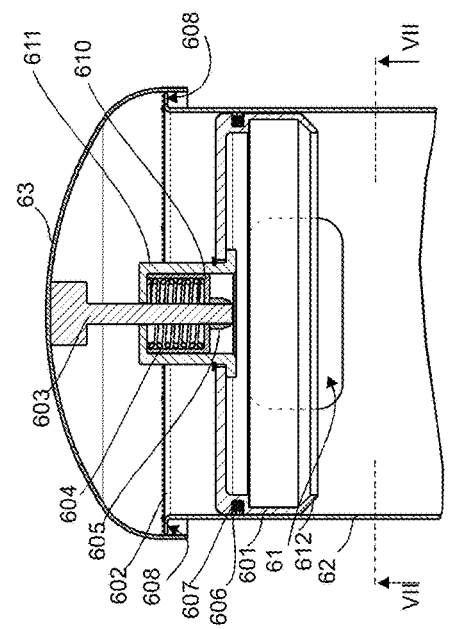
FIG. 6 presents a cross-section of a detail of the input point of FIG. 5, sectioned along the line VI-VI of FIG. 7 and in a second operating state.
Figure 5:
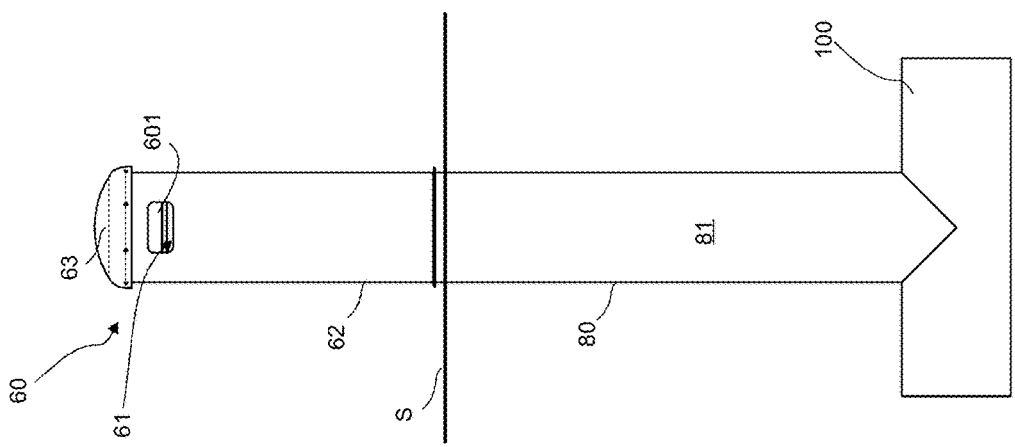
FIG. 5 presents an input point of an embodiment of the invention, in a second operating state.

The wall of the shut-off element 601 that is towards the side wall 62 of the input point 61 comprises a wall section 612 pointing inwards in the channel space. In the embodiment of FIGS. 2 and 6, the shut-off element 601 is a cylindrical and downward-opening domed part.

A support part 609 is arranged between the top wall 63 and the side wall 62 of an input point. Apertures 608 for conducting replacement air into the space between the top wall 63 and the shut-off element 601 are arranged between the top wall 63 and the side wall 62 of the input point. The space between the top wall 63 and the shut-off element 601 is therefore connected by means of the apertures to the atmosphere surrounding the input point. In FIG. 3 the support part 609 is a toroidal part. Alternatively there can be a plurality of support parts and the apertures 608 are arranged between the adjacent, e.g. ribbed, support parts.

When the suction brought about by the partial-vacuum generator, e.g. by fans or another pump device, of the pneumatic material-conveying system acts from the direction of the conveying pipe 100 into the feeder channel 81 of an input point, it pulls replacement air into the feeder channel via the input aperture 61. When the suction effect is great enough, the shut-off element 601 starts to move from the first position of FIG. 2 towards the second position of FIG. 6 against the force effect brought about by the flexing element 604. This makes the input aperture smaller, i.e. constricts the pathway for replacement air traveling via the input aperture 61 into the feeder channel 81 and onwards into the conveying pipe 100. Constricting the input aperture 61 with the shut-off element 601 increases the flow resistance of the input point.

When the effect of the suction brought about by the partial-vacuum generator of the pneumatic material-conveying system, e.g. by fans or another pump device, from the direction of the conveying pipe 100 into the feeder channel 81 of an input point ceases or considerably decreases, the spring force acts on the shut-off element more than the suction effect, and the shut-off element starts to move from the second position towards the first position. In this case after the shut-off element 601 has displaced into the first position and the input aperture 61 of the input point is fully open, material w can again be fed into the feeder channel 81 via the input aperture 61 of the input point 60.

The flow resistance of an input point 60, such as the so-called local resistance caused by an input aperture 61 or the flow resistance produced by a structure acting on the air flow of an input point, is formed or adapted to be according to the requirements of the material conveying system. In this case, according to one embodiment, the flow resistance of an input point 60, or the sum of the flow resistances of a number of input points 60, at least when the shut-off element 601 is in the second position, is adapted to be greater than the flow resistance of the material conveying pipe. In this case suction or a transporting air flow is achieved in the material conveying pipe also at the point of the farthest input point, even though there is an at least partially open medium connection to the conveying pipe 100 from the input aperture 61 of the other input points 60 possibly disposed between the partial-vacuum generator and the input point 60 that is farthest from it against the material conveying direction. By arranging input points according to the invention, in which input points the input apertures 61 are made smaller automatically with a shut-off element 601 on the basis of the suction acting in said input points, and thereby increasing the flow resistance, a larger number of input points 60 can be arranged in a pneumatic material-conveying system than in a case in which the flow resistance of the input points 60 does not change on the basis of the flow resistance.

The flow resistance of an input point 60 can be effectively acted upon, inter alia, by acting on the size of the input aperture 61. In one embodiment of the invention the size of an input aperture 61 is e.g. 150 mm×75 mm, when the aperture is mainly rectangular, and the shut-off element is in the first position. When the shut-off element 601 is in the second position, only a part of the input aperture 61 remains open, e.g. ⅓-½ (in which case the open portion of the input aperture 61 is, in the second position of the shut-off element, e.g. in the size range of 150 mm×25 mm-150 mm×37 mm).

By means of the invention the input points are quite simple and operationally reliable. With the solution according to the invention the constriction of an input aperture of an input point functioning by means of a suction effect is brought about, the operating mechanism of which constriction is simple and well protected. By means of the shut-off element 601 according to the invention, therefore, the flow resistance of an input point 60 can be effectively acted upon. Thus, the solution of the invention enables effective emptying of the input points farther from the delivery end of a material conveying system into the material conveying pipe and the transportation of the material in the conveying pipe.

In practice the input point that is nearest the material container of the material conveying system empties first. The material W displaces in the conveying pipe towards the delivery end of material, i.e. the material container, and at the same time downwards in the feeder channel 81 into the conveying pipe 100.

In a corresponding manner the suction effect progresses in the conveying piping and empties the input points. The flow resistances of the input points are adapted by means of a shut-off element in such a way that the material W of also the last input point 60 to be emptied displaces from the input point into the conveying pipe 100 and onwards in the conveying pipe towards the delivery end, i.e. towards the material container, even though the connection of the input apertures 61 of the other input points 60 between the input point 60 and the material container to the conveying pipe 100 are partially open. When all the input points have been emptied and the material has displaced into the delivery end, i.e. into the material container, the suction of the partial-vacuum generator can be switched off. The containers of the input points 60 can again be filled via the input apertures 61 until they are emptied the next time.

Figure 9:
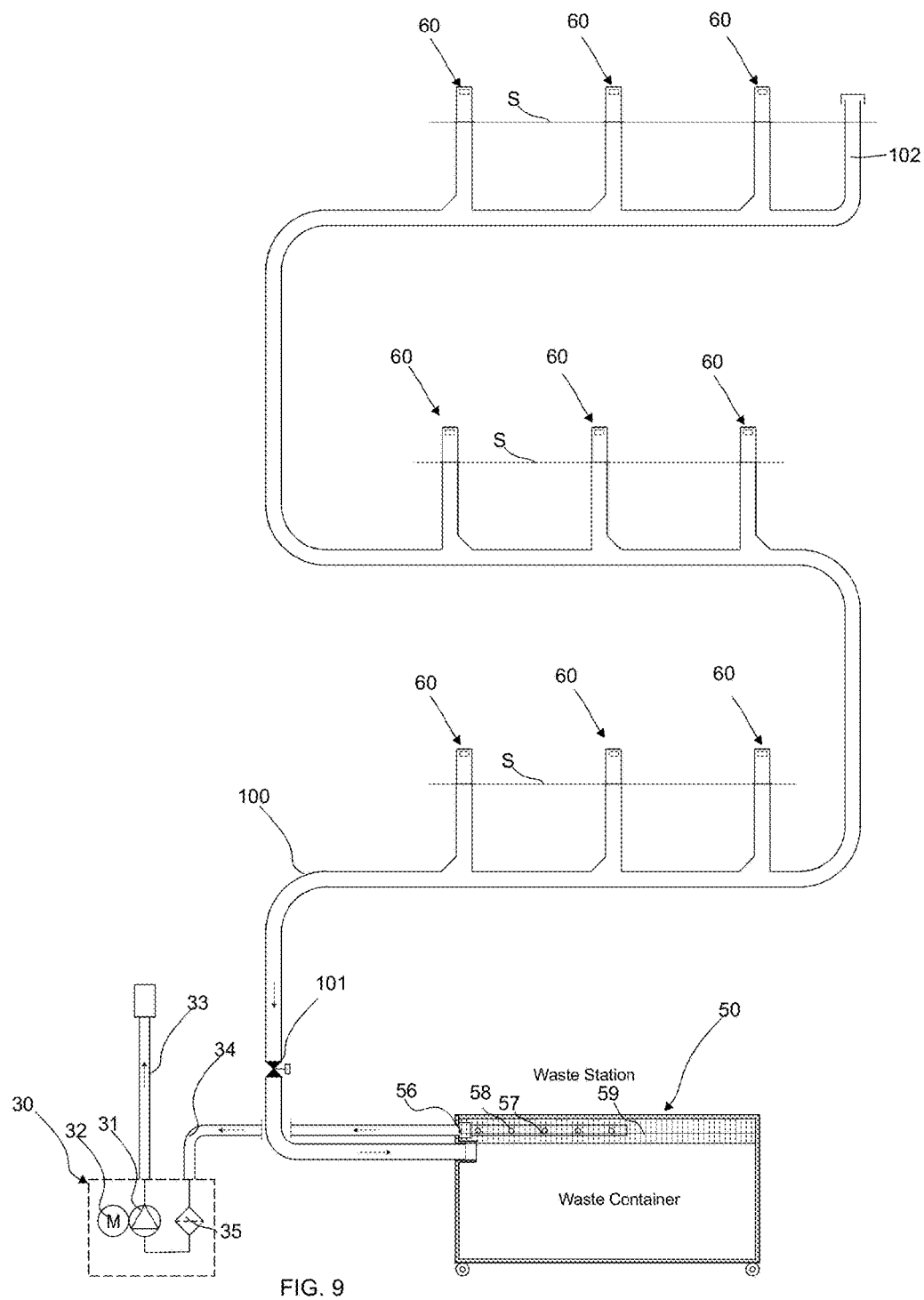
FIG. 9 presents a system according to an embodiment of the invention.
Figure 10:
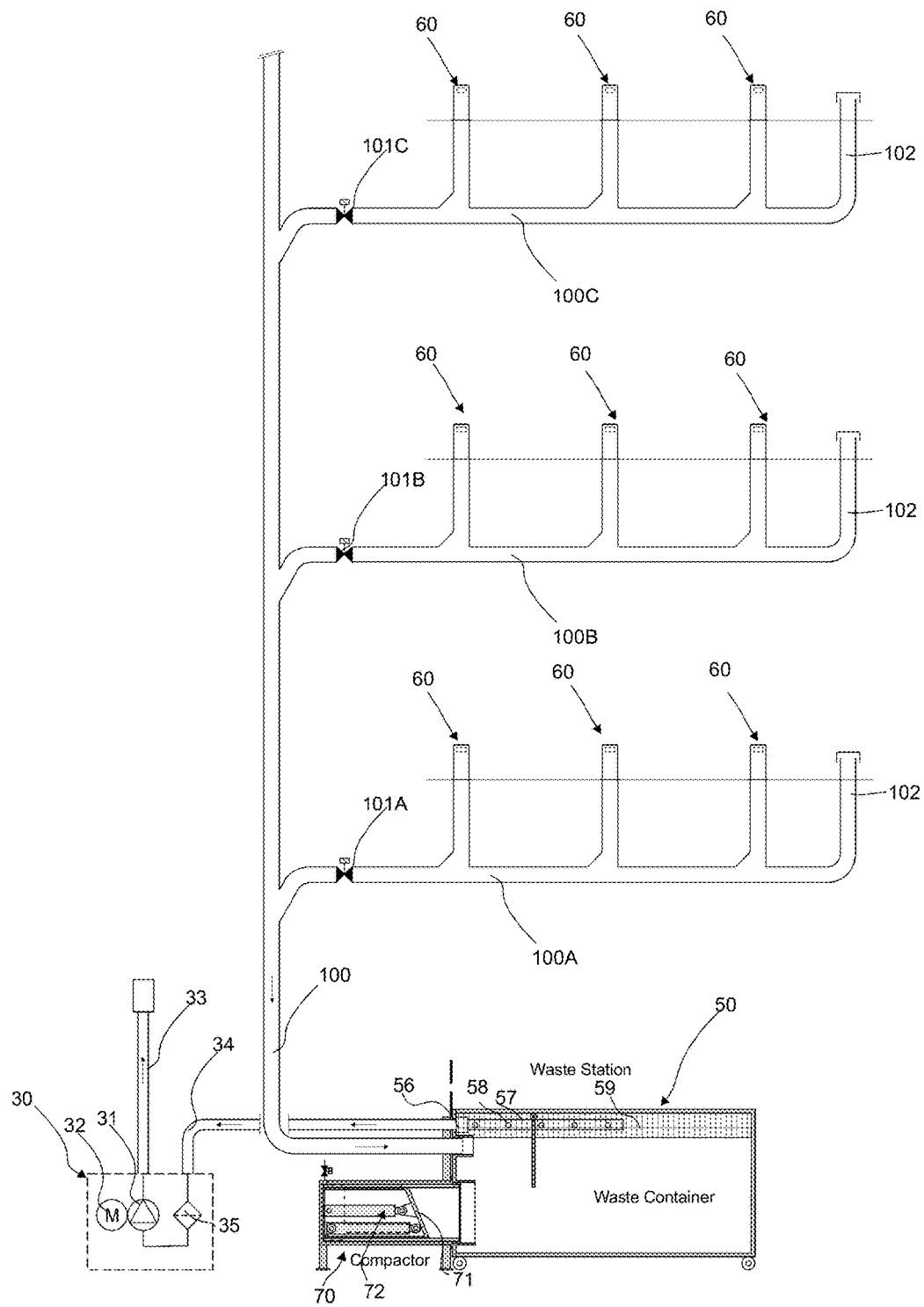
FIG. 10 presents a system according to an embodiment of the invention.
Figures 11, 11A:
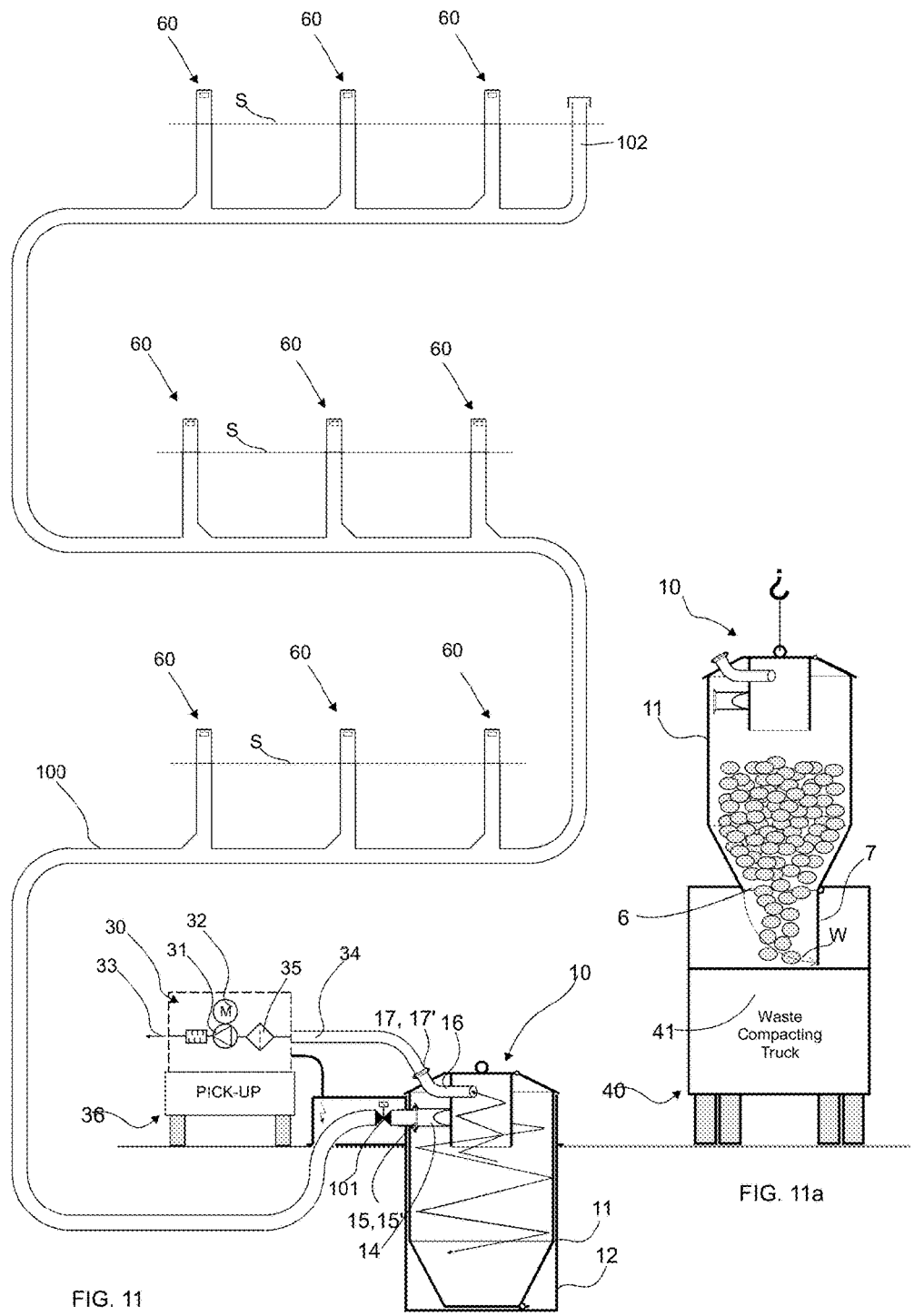
FIG. 11 presents a second system according to the invention.
FIG. 11a presents the emptying phase of the collection tank of the system of FIG. 11.

FIGS. 9, 10 and 11 present various material conveying systems according to an embodiment of the invention. In the embodiment according to FIG. 9 input points 60 are arranged along the conveying pipe 100. At the end of the conveying pipe is a replacement air duct 102. The conveying pipe is connected to a collection container 50 for material at its other end. FIGS. 9, 10 and 11 present a valve 101, which is arranged in the conveying pipe 100, but depending on the embodiment the solution according to the invention also functions without a valve 101. A suction pipe 57 having apertures 58 that open into the container space of the material collection container is arranged in the material collection container. A wall 59 allowing air to pass through, such as a net, that prevents waste material getting into the suction apertures of the suction pipe is arranged in the container. The suction pipe is connected with a connection 56 to the suction-side channel 34 of the fans 31 of the partial-vacuum generator 30. The partial-vacuum generator is driven with a drive device 32. The blowing side of the partial-vacuum generator is connected to the exhaust pipe 33. In the embodiment of the figure a filtering means 35 is arranged in the channel of the suction side of the partial-vacuum generator.

The conveying piping 100 can be arranged to travel under the surface S of the ground or in cellars. In the embodiment of FIG. 9 the conveying piping comprises replacement air ducts 102. In a conveying situation the partial-vacuum generator is connected to function, in which case the suction side of it is connected via the material collection container 50 to the conveying pipe 100. The input points 60 empty, starting from the input point that is closest to the material collection container, and the material displaces along with the transporting air into the material collection container 50, in which the material separates from the transporting air and remains in the container. The transporting air, for its part, is conducted from the container into the suction pipe 57 and via the suction channel 34 into the exhaust pipe 33. When the input points 60 have been emptied, the partial-vacuum generator 30 can be stopped. The container 50 in the embodiment of the figures is a transportation container, which is adapted to be detachable from the conveying pipe 100 and from the suction channel 34. The container 50 can be transported for emptying elsewhere. It can be replaced with an empty container.

FIG. 10 presents a second embodiment of a system according to the invention. In it a number of branch conveying pipes 100A, 100B, 100C are arranged in the main conveying pipe 100, from which branch conveying pipes there is a connection, which is openable and closable with valve means 101A, 101B, 101C, into the main conveying pipe 100. In each branch conveying pipe input points 60 are arranged at a distance from each other. In addition, there is a replacement air duct 102 in each branch conveying pipe. The main conveying pipe 100 is connected to the material collection container 50, in connection with which is arranged a press device/compactor device 70, with the compression means 71 of which the material in the material container 50 can be compressed/compacted, said compression means being driven with a drive device 72. The partial-vacuum generator in FIG. 7 corresponds with what is described in connection with FIG. 6. In the embodiment of FIG. 10 the input points 60 are emptied consecutively one branch conveying pipe at a time. In this case the connection from the main conveying pipe 100 into the branch conveying pipe in question is opened with the valve means 101A, 101B, 101C of the branch conveying pipe 100A or 100B or 100C in question that is intended for emptying, in which case the suction effect of the partial-vacuum generator 30 is able to act in the branch conveying pipe. The input points 60 connected to the branch conveying pipe empty, beginning from the input point that is closest to the main conveying pipe and progressing in an emptying sequence that is in the opposite direction with respect to the material conveying direction.

FIG. 11 presents yet another embodiment of the material conveying system according to the invention. In it the material container is a separating device 10, which is a combination of a deep collection container for material, which is formed from an external container 12 and a collection container 11, and from means arranged in it separating from each other the transporting air and the material being conveyed. According to one embodiment the separating device is a so-called cyclone separator. The conveying pipe 100 can be connected to the collection container 11 of the separating device 10, in which collection container the material W being transported is separated from the transporting air. A connecting means 15' is formed in the conveying pipe 100 and a counterpart 15 in the branch coupling 14 formed in the top part of the collection container 11. The connecting means 15' and the counterpart 15 together form e.g. a snap-on coupling. A second connection 17 is formed in the collection container 11, into which connection a pipe or hose 34 coming from the partial vacuum source 30 can be connected with a counterpart 17'.

The external container 12 of the deep collection container is embedded below the surface S of the ground or corresponding.

According to the embodiment, the partial-vacuum generator is arranged to be movable. According to the embodiment, the partial-vacuum source 30 is a movable apparatus arranged in a mobile means 36, e.g. in a vehicle. The mobile means 36 can be e.g. a small lorry or a van or the partial-vacuum source 30 can be arranged in a trailer, which can be towed by a vehicle.

In the embodiment of FIG. 11 the material w, such as waste material, separated from the transporting air drifts to the bottom part of the collection container 11. In the figure the drifting of the separated material to the bottom part of the collection container 11 of the separating device 10 is described with an arrow. The material w is presented in the figure as grey. The separated material is removed, e.g. according to need, from the collection container. This material removal phase is presented e.g. in FIG. 11a, in which the collection container is lifted from the external container 12 with lifting means (the lifting device itself is not presented), into the container 41 of a transportation means, such as of a garbage truck 40, e.g. via an output aperture 6 for material arranged in the bottom part of the collection container 11, e.g. by opening the hatch 7 closing the output aperture 6.

The invention thus relates to a method for feeding in and for transporting material in a pneumatic conveying system for material, which conveying system comprises at least one input point 60 for material, a material-conveying pipe 100, which can be connected to an input point 60, and a material container 10, 50, in which the material being transported is separated from the transporting air, and also means for achieving a partial vacuum/pressure difference and/or a transporting air flow in the conveying pipe 100 at least during the transporting of material, which means comprise at least one partial-vacuum source 30. In the method the suction side of the partial-vacuum source 30 is connected to act in the conveying pipe 100 and onwards to an input point 60 arranged in the conveying pipe, or to act at least in the feeder channel 81 that is between the conveying pipe and an input point, in which case the input point 60, or at least the feeder channel 81, intended for emptying that is closest to the material container in the conveying direction of the material empties and the material displaces into the conveying pipe 100, in that arranged in the input point, on the inside of said input point and on the opposite side of the input aperture 61 with respect to the feeder channel 81, is a shut-off element 601, which is moved by means of the suction produced by the partial-vacuum source 30 from a first position, in which the shut-off element 601 does not make the pathway through the input aperture 61 into the feeder channel 81 essentially smaller, into a second position, in which the shut-off element 601 does make the pathway through the input aperture 61 into the feeder channel 81 essentially smaller, when the pressure on the first side, on the feeder-channel 81 side, of the shut-off element 601 is smaller than on the second side, on the opposite side with respect to the feeder channel, of the shut-off element 601.

According to one embodiment in the method in the second position of the shut-off element 601 the flow resistance of the input point 60, such as the flow resistance brought about by the input aperture 61 that is made smaller with the shut-off element, or the flow resistance brought about by a number of input points 60, such as the flow resistance of the at least partially open input apertures 61 of a number of input points 60, is formed to be greater than the flow resistance of the conveying pipe 100 of material in such a way that a transporting air flow is produced in the conveying pipe also in the input point 60 intended for emptying that is farthest in the opposite direction with respect to the conveying direction of the material and/or in such a way that the suction produced by a partial-vacuum source acts at least in the feeder channel of the farthest input point, even though between the suction side of the partial-vacuum source and the input point intended for emptying there is at least one input point having an at least partially open input aperture that is in medium connection with the conveying pipe for material.

According to one embodiment next the second input point 60, or at least the material w that is in the feeder channel 81 of it, that is farther in the conveying direction of material from the material container 10, 50 with respect to the input point first emptied, is emptied into the conveying pipe, in which case the pathway between the input aperture 61 of the input point and the conveying pipe 100 is closed with the shut-off element 601 arranged in connection with the input aperture 61 of the second input point 60, or at least the flow cross-sectional area of the pathway is made essentially smaller, when the pressure in the pathway is essentially smaller than on the opposite side of the shut-off means with respect to the feeder channel.

According to one embodiment the shut-off element 601 is moved from the second position into the first position with a flexing means 604, when the suction effect brought about by the partial-vacuum source 30 in the feeder channel 81 of an input point has essentially decreased or ceased.

According to one embodiment the movement of the shut-off element 601 from the first position into the second position is resisted with a flexing means 604.

According to one embodiment the pathway running through the input aperture 61 becomes smaller in flow cross-sectional area when the pressure acting on the second side of the piston-like shut-off element moves the shut-off means 601 together with the aid of the suction brought about by the partial-vacuum source 30.

According to one embodiment in the method the pathway of replacement air is closed or the pathway of replacement air is made essentially smaller from the input aperture of an input point 61 to the conveying piping 100 with a shut-off element 601.

According to one embodiment the shut-off element 601 displaces from the second position into the first position and opens or essentially enlarges the flow cross-sectional area of the pathway through the input aperture 61 when the suction effect brought about in the pathway by the partial-vacuum generator 30 decreases or ceases.

The invention also relates to an input point of a pneumatic material-conveying system, which input point 60 comprises one or more input apertures 61 for feeding material into a feeder channel 81, which is connected to a conveying pipe 100. Arranged in the input point 61, on the inside of said input point and on the opposite side of the input aperture 61 with respect to the feeder channel 81, is a shut-off element 601, which is arranged to be movable, by means of the suction produced by the partial-vacuum source 30, from a first position, in which the shut-off element 601 does not make the pathway through the input aperture 61 into the feeder channel 81 essentially smaller, into a second position, in which the shut-off element 601 does make the pathway through the input aperture 61 into the feeder channel 81 essentially smaller, when the pressure on the first side, on the feeder-channel 81 side, of the shut-off element 601 is smaller than on the second side, on the opposite side with respect to the feeder channel, of the shut-off element 601.

According to one embodiment the flow resistance of an input point 60, such as the flow resistance brought about by the input aperture 61 that is made smaller with a shut-off element, or the flow resistance brought about by a number of input points 60 that are simultaneously in connection with the conveying pipe, such as the flow resistance of the at least partially open input apertures 61 of a number of input points 60, is formed to be greater than the flow resistance of the conveying pipe 100 for material in such a way that a transporting air flow can be produced in the conveying pipe 100 also in the input point 60 intended for emptying that is farthest in the opposite direction with respect to the conveying direction of the material and/or in such a way that at least the feeder channel of the farthest input point can be acted upon with the suction produced by a partial-vacuum source that can be connected to the conveying pipe, even though between the suction side of the partial-vacuum source and the input point intended for emptying there is at least one input point having an at least partially open input aperture that is in medium connection with the conveying pipe.

According to one embodiment the shut-off element 601 is a piston part.

According to one embodiment, arranged in connection with a shut-off element 601 is a flexing means 604, which is adapted to displace the shut-off element 601 from the second position into the first position.

According to one embodiment an input point comprises a support means/guide means 603, which extends through the frame 602 of the shut-off element 601 from the first side to the second side.

According to one embodiment the support means/guide means 603 is arranged at its first end on the structures, e.g. on the top wall 63, of the input point.

According to one embodiment the flexing means 604 is arranged to act between the fixing means 605, such as a nut, arranged on the second end of the support means/guide means 603 and the frame 602 of the shut-off element.

According to one embodiment an input point 61 comprises at least one aperture 608 from outside the input point to inside the input point into the space between the wall that is away from the feeder channel 81 of the frame 602 of the shut-off element and the walls 62, 63 of the input point.

According to one embodiment the shut-off element 601 is arranged slidably against the inside surface of the side wall 62 of the input point.

According to one embodiment an input point 60 for material is an input point for waste material or recyclable material.

According to one embodiment an input point 60 for material is adapted to function as a rubbish collection point, such as a litter bin.

The invention also relates to a pneumatic conveying system for material, which system comprises at least one input point 60 for material, which input point is connected to a conveying piping 100 for material, means for achieving a partial vacuum/pressure difference/transporting air flow in the conveying piping, and also a material container 10, 50, into which the material being transported together with the transporting air is conducted and in which the transporting air and the material being transported are separated from each other. Arranged in at least one input point 61 of the system, on the inside of said input point and on the opposite side of the input aperture 61 with respect to the feeder channel 81, is a shut-off element 601, which is arranged to be movable, by means of the suction produced by the partial-vacuum source 30, from a first position, in which the shut-off element 601 does not make the pathway through the input aperture 61 into the feeder channel 81 essentially smaller, into a second position, in which the shut-off element 601 does make the pathway through the input aperture 61 into the feeder channel 81 essentially smaller, when the pressure on the first side, on the feeder-channel 81 side, of the shut-off element 601 is smaller than on the second side, on the opposite side with respect to the feeder channel, of the shut-off element 601.

According to one embodiment the input aperture 61 of an input point 60 of the system is adapted to be in medium connection with the conveying pipe 100 for material and that the flow resistance of the input point 60, such as the flow resistance brought about by the input aperture 61 that is made smaller with a shut-off element, or the flow resistance brought about by a number of input points 60 that are simultaneously in connection with the conveying pipe 100, such as the flow resistance of the at least partially open input apertures 61 of a number of input points 60, is formed to be greater than the flow resistance of the conveying pipe 100 for material in such a way that a transporting air flow can be produced in the conveying pipe 100 also in the input point 60 intended for emptying that is farthest in the opposite direction with respect to the conveying direction of the material and/or in such a way that the suction produced by a partial-vacuum source that can be connected to the conveying pipe can act at least in the feeder channel of the farthest input point, even though between the suction side of the partial-vacuum source and the input point intended for emptying there is at least one input point having an at least partially open input aperture that is in medium connection with the conveying pipe.

According to one embodiment the system comprises a number of input points 60 arranged along the conveying piping 100, for emptying which input points the suction side of a partial-vacuum generator 30 is connected to the material container 50, 10 and from where there is a flow connection onwards into the conveying pipe 100.

According to one embodiment the system comprises a material container 50, which is a transportation container.

According to one embodiment the system further comprises a material container 50, 10, which is a deep collection container-separating device 10, into which material is conveyed from input points 60 via a conveying pipe 100, by means of suction/a pressure difference produced by a partial-vacuum source 21, and that in the emptying phase the collection container 11 is lifted with lifting means and the material w that has collected in the collection container 11 is emptied via an openable and closable aperture 6 arranged in the bottom part of the collection container 11.

According to one embodiment an input point 60 according to the characteristic features of any of the aforementioned embodiments is adapted for use in the system.

In the system and method according to the invention the mobile partial-vacuum source presented e.g. in publication WO2011151522, or an ordinary partial-vacuum source arranged in the proximity of the separating device, e.g. arranged in a container, can be used.

It is obvious to the person skilled in the art that the invention is not limited to the embodiments presented above, but that it can be varied within the scope of the claims presented below. The characteristic features possibly presented in the description in conjunction with other characteristic features can also, if necessary, be used separately to each other.

The invention claimed is:

1. A method for feeding in and transporting material in a pneumatic conveying system for material, which conveying system comprising the following steps:
   providing at least one input point for supplying material,
   providing a material conveying pipe operatively connected to the input point, and
   providing a material container wherein the material being transported is separated from conveying air, and
   providing a partial-vacuum source for generating a partial vacuum/a pressure difference and a transporting air flow in the conveying pipe at least during the transporting of material, wherein a suction side of the partial-vacuum source is connected to act in the conveying pipe and onwards to the input point operatively connected to the conveying pipe, or to act at least in a feeder channel that is between the conveying pipe and an input point,
   providing the feeder channel, for emptying to be closest to the material container in a conveying direction wherein the material empties into the material container,
   providing a shut-off element on an inside of said input point and on an opposite side of an input aperture with respect to the feeder channel, said shut-off element being moved by means of the suction produced by the partial-vacuum source from a first position, in which the shut-off element does not make a pathway through the input aperture into the feeder channel smaller, into a second position, in which the shut-off element does make the pathway through the input aperture into the feeder channel smaller, when the pressure on a first side, on the feeder channel side, of the shut-off element is smaller than on a second side, on an opposite side with respect to the feeder channel, of the shut-off element.

2. The method according to claim 1, wherein in the method in the second position of the shut-off element the flow resistance of an input point, the flow resistance brought about by an input aperture that is made smaller with the shut-off element, or the flow resistance brought about by a number of input points, the flow resistance of the at least partially open input apertures of a number of input points, is formed to be greater than a flow resistance of the conveying pipe for material wherein a transporting air flow is produced in the conveying pipe also in the input point intended for emptying that is farthest in an opposite direction with respect to the conveying direction of the material and wherein the suction produced by the partial-vacuum source acts at least in the feeder channel of a farthest input point, even though between the suction side of the partial-vacuum source and the input point intended for emptying there is at least one input point having an at least partially open input aperture that is in medium connection with the conveying pipe for material.

3. The method according to claim 1, wherein next the second input point, or at least the material that is in the feeder channel, that is farther in the conveying direction of material from the material container with respect to the input point first emptied, is emptied into the conveying pipe, in which case the pathway between the input aperture of the input point and the conveying pipe is closed with the shut-off element arranged in connection with the input aperture of the second input point, or at least a flow cross-sectional area of the pathway is made smaller, when the pressure in the pathway is smaller than on the opposite side of the shut-off element with respect to the feeder channel.

4. The method according to claim 1, wherein the shut-off element is moved from the second position into the first position with a flexing means, when the suction effect brought about by the partial-vacuum source in the feeder channel of an input point has decreased or ceased.

5. The method according to claim 1, wherein the movement of the shut-off element from the first position into the second position is resisted with a flexing means.

6. The method according to claim 1, wherein the shut-off element closes the pathway running through the input aperture or constricts the pathway running through the input aperture to be smaller in flow cross-sectional area when the pressure acting on the second side of the piston-like shut-off element moves a shut-off means together with the aid of the suction brought about by the partial-vacuum source.

7. The method according to claim 1, wherein in the method the pathway of replacement air is closed or the pathway of replacement air is made smaller from the input aperture of an input point to the conveying piping with the shut-off element.

8. The method according to claim 1, wherein the shut-off element displaces from the second position into the first position and opens or enlarges the flow cross-sectional area of the pathway through the input aperture when the suction effect brought about in the pathway by the partial-vacuum generator decreases or ceases.

9. An input point of a pneumatic material-conveying system, which input point comprising:
one or more input apertures for feeding material into a feeder channel, which is connected to a conveying pipe,
a shut-off element arranged in the input point, on the inside of said input point and on an opposite side of the one or more input apertures with respect to the feeder channel, and
said shut-off element being arranged to be movable, by means of a suction produced by a partial-vacuum source, from a first position, in which the shut-off element does not make the pathway through the one or more input apertures into the feeder channel smaller, into a second position, in which the shut-off element does make the pathway through the input aperture into the feeder channel smaller, when pressure on a first side, on a feeder-channel side, of the shut-off element is smaller than on a second side, on an opposite side with respect to the feeder channel, of the shut-off element.

10. The input point according to claim 9, wherein the flow resistance of the input point, the flow resistance brought about by the input aperture that is made smaller with a shut-off element, or the flow resistance brought about by a number of input points that are simultaneously in connection with the conveying pipe, the flow resistance of the at least partially open input apertures of a number of input points, is formed to be greater than the flow resistance of the conveying pipe for material wherein a transporting air flow is produced in the conveying pipe also in the input point intended for emptying that is farthest in the opposite direction with respect to the conveying direction of the material and that at least the feeder channel of a farthest input point is acted upon with the suction produced by the partial-vacuum source that is connected to the conveying pipe, even though between the suction side of the partial-vacuum source and the input point intended for emptying there is at least one input point having an at least partially open input aperture that is in medium connection with the conveying pipe.

11. The input point according to claim 9, wherein the shut-off element is a piston part.

12. The input point according to claim 9, wherein arranged in connection with the shut-off element is a flexing means, which is adapted to displace the shut-off element from the second position into the first position.

13. The input point according to claim 9, wherein an input point comprises a support means/guide means, which extends through a frame of the shut-off element from the first side to the second side.

14. The input point according to claim 13, wherein the support means/guide means is arranged at a first end on a top wall, of the input point.

15. The input point according to claim 9, wherein a flexing means is arranged to act between a fixing means, a nut, arranged on the second end of the support means/guide means and a frame of the shut-off element.

16. The input point according to claim 9, wherein an input point comprises at least one aperture from outside the input point to inside the input point into the space between a wall that is away from the feeder channel of a frame of the shut-off element and the walls of the input point.

17. The input point according to claim 9, wherein the shut-off element is arranged slidably against the inside surface of a side wall of the input point.

18. The input point according to claim 9, wherein the input point for material is an input point for waste material or recyclable material.

19. The input point according to claim 9, wherein the input point for material is adapted to function as a rubbish collection point, a litter bin.

20. A pneumatic conveying system for material, which system comprising:
at least one input point for supplying material, said input point being operatively connected to conveying piping for the material,
a partial-vacuum source for achieving a partial vacuum/a pressure difference/a transporting air flow in the conveying piping, and
a material container, wherein the material being transported together with the transporting air is deposited and in which the transporting air and the material being transported are separated from each other,
a shut-off element being arranged in at least one input point of the system, on an inside of said input point and on an opposite side of the input aperture with respect to the feeder channel, said shut-off element being arranged to be movable, by means of suction produced by the partial-vacuum source, from a first position, in which the shut-off element does not make a pathway through the input aperture into the feeder channel smaller, into a second position, in which the shut-off element does make the pathway through the input aperture into the feeder channel smaller, when the pressure on a first side, on a feeder channel side, of the shut-off element is smaller than on a second side, on an opposite side with respect to the feeder channel, of the shut-off element.

21. The system according to claim 20, wherein the input aperture of an input point of the system is adapted to be in medium connection with the conveying pipe for material and in that the flow resistance of the input point, the flow resistance brought about by the input aperture that is made smaller with a shut-off element, or the flow resistance brought about by a number of input points that are simultaneously in connection with the conveying pipe, the flow resistance of the at least partially open input apertures of a number of input points, is formed to be greater than the flow resistance of the conveying pipe for material wherein a transporting air flow is produced in the conveying pipe also in the input point intended for emptying that is farthest in the opposite direction with respect to a conveying direction of the material and wherein at least the feeder channel of the farthest input point is acted upon with the suction produced by the partial-vacuum source that is connected to the conveying pipe, even though between the suction side of the partial-vacuum source and the input point intended for emptying there is at least one input point having an at least partially open input aperture that is in medium connection with the conveying pipe.

22. The system according to claim 20, wherein the system comprises a number of input points arranged along the conveying piping, for emptying which input points the suction side of the partial-vacuum source is connected to the material container and from where there is a flow connection onwards into the conveying pipe.

23. The system according to claim 20, wherein the system comprises the material container, which is a transportation container.

24. The system according to claim 20, wherein the system comprises the material container, which is a deep collection container-separating device, into which material is conveyed from input points via the conveying piping, by means of suction/a pressure difference produced by the partial-vacuum source, and in that in the emptying phase the collection container is lifted and the material that has collected in the collection container is emptied via an openable and closable aperture arranged in a bottom part of the collection container.

25. The system according to claim 20, wherein an input point is adapted for use in the system,
wherein the input point comprises one or more input apertures for feeding material into the feeder channel, which is connected to the conveying pipe, and
wherein arranged in the input point, on the inside of said input point and on the opposite side of the input aperture with respect to the feeder channel, is the shut-off element, which is arranged to be movable, by means of the suction produced by the partial-vacuum source, from a first position, in which the shut-off element does not make the pathway through the input aperture into the feeder channel smaller, into a second position, in which the shut-off element does make the pathway through the input aperture into the feeder channel smaller, when the pressure on the first side, on the feeder-channel side, of the shut-off element is smaller than on the second side, on the opposite side with respect to the feeder channel, of the shut-off element.

* * * * *